United States Patent [19]

Stilwell

[11] Patent Number: 4,647,724
[45] Date of Patent: Mar. 3, 1987

[54] RINGING INTERFACE CARD FOR TELEPHONE TEST EQUIPMENT

[75] Inventor: Bobby Stilwell, Versailles, Ky.

[73] Assignee: GTE Service Corporation, Stamford, Conn.

[21] Appl. No.: 715,313

[22] Filed: Mar. 25, 1985

[51] Int. Cl.⁴ .................................................. H04M 3/30
[52] U.S. Cl. .................................... 379/27; 379/25
[58] Field of Search .................. 179/175.3 R, 175.2 B, 179/175.25, 175.3 A, 51 AA, 175

[56] References Cited

U.S. PATENT DOCUMENTS 4,544,809 10/1985 Stupoints et al. ............ 179/179.2 B

*Primary Examiner*—Stafford D. Schreyer
*Attorney, Agent, or Firm*—Theodore C. Jay, Jr.

[57] ABSTRACT

The present invention is directed toward a new type of ringing interface card which overcomes the inability of known cards for testing multi-party service and which enable a technician to measure the ringing frequency and simultaneously to detect which of the tip and ring conductors receives the ringing signal.

4 Claims, 1 Drawing Figure

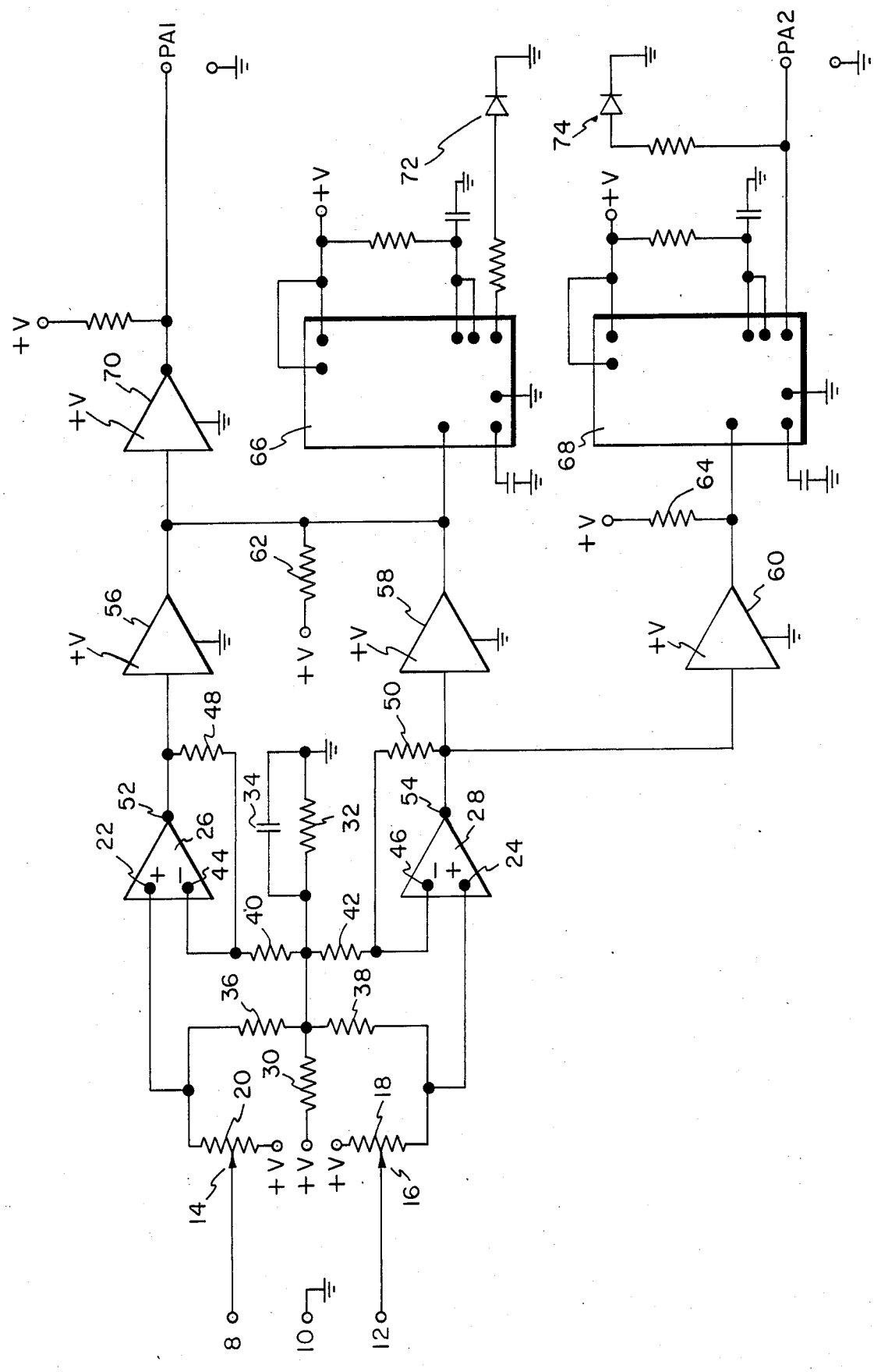

RINGING INTERFACE CARD FOR TELEPHONE TEST EQUIPMENT

CROSS REFERENCE TO CO-PENDING APPLICATIONS

The ringing interface card which is described and claimed in the present application is adapted for use in telephone test equipment disclosed in co-pending applications respectively entitled, "An Arrangement for Line Jumper Testing" and "An Arrangement For Subscriber Line Ringing" having respective Ser. Nos. 563738 now U.S. Pat. No. 4,558,188, and 563737 now U.S. Pat. No. 4,544,809. Both applications were filed on Dec. 21, 1983. All of these applications are under common ownership.

BACKGROUND OF THE INVENTION

When an existing telephone switching exchange in a central office is to be replaced by a new exchange, the cable pair or line of each subscriber must be disconnected from the old exchange and connected to the new exchange in such manner as to avoid service interruptions or inconvenience to the subscribers at or after cutover.

To this end, the subscriber data is collected into a computer data base and this information is compared to the data base proposed for the new exchange. The proposed data base is then corrected, if necessary, to conform to the subscriber data. Testing then ensues to determine if the subscriber equipment then in use actually conforms to the subscriber data.

One test that must be performed is the ringing frequency test. Some subscriber telephones will only respond to a twenty-five Hertz signal; other telephones will only respond to a fifty Hertz signal and still other telephones will respond only to other preselected frequencies. If a ringing signal of incorrect frequency is sent to a subscriber, the telephone will not ring and the subscriber will not know that a call is to be received. Accordingly, it is necessary to perform call verification of the ringing frequencies of subscribers telephones by placing calls using the old exchange. Test equipment using a ringing interface card would be employed to detect seven cycles of the ringing frequency in order to measure the ringing frequency. (The time period which corresponds to seven cycles is so short that the subscribers telephone will not respond and the subscriber will not know that a test is being made). This arrangement was designed for testing private line service using metallic ringing.

However, certain exchanges now being replaced provided multi-party service using a divided ringing system, and such service must continue to be provided when a new exchange is installed. The subscribers lines which are connected between the exchange and the telephone are cable pairs having a tip conductor and a ring conductor. In a divided ringing system, some ringing signals are applied between the tip conductor and ground while others are applied between the ring conductor and ground. Hence, for multi-party service, it is necessary not only to measure the ringing frequency but also to detect which of the tip and ring conductors receives the ringing signal.

The present invention is directed toward a new type of ringing interface card which overcomes the inability of known cards for testing multi-party service and which enables a technician to measure the ringing frequency and simultaneously to detect which of the tip and ring conductors receives the ringing signal.

SUMMARY OF THE INVENTION

A ringing interface card in accordance with the invention is adapted for use in testing signal tip and ring conductor connections of telephone cable connected between a telephone exchange and subscriber telephones as well as measuring the ringing signal frequencies utilized in said phones.

The card employs a first set of terminals for receiving ring type and tip type ringing signals in the form of frequency variable alternating voltages which have successive half cycles with alternate positive and negative polarity and which can differ in frequency. This terminal set includes first, second and third terminals. Ring signals are applied between the first and second terminals. Tip signals are applied between the third and second terminals. These signals are supplied to said first terminal set with such timing that ring and tip signals are not present at the same time. In other words, since the testing process involves only one telephone at a time, the card will receive ring signals or tip signals but never both.

First means coupled to the first and second terminals responds only to the presence of ring signal half cycles of selected polarity as, for example, positive polarity, to produce a first pulse train. The first means does not respond to the half cycles of negative polarity so the first pulse train is a train of pulses of constant polarity.

Second means coupled to the third and second terminals responds only to the presence of tip signal half cycles of selected polarity, as, for exmple, positive polarity to produce a second pulse train. The second means does not respond to the half cycles of negative polarity so the second pulse train is a train of pulses of constant polarity.

The card also utilizes a second set of terminals, the second set including fourth, fifth and sixth terminals, the fifth terminal being connected to said second terminal.

Third means is coupled at its input to both the first and second means and is coupled at its output to the fourth and fifth terminals. The third means responds to the presence of either one of the first and second pulse trains to produce a third pulse train which can be subsequently processed to determine the pulse recurrence frequency of the first or second train. This recurrence frequency is the ringing frequency.

In order to determine whether the ringing signal is a tip signal or a ring signal, an additional test is necessary. To this end, fourth means is coupled at its output between the sixth and fifth terminals. The fourth means is coupled at its input to the output of the first means. The fourth means responds to the presence of the first pulse train to produce a constant direct output voltage between the sixth and fifth terminals, signifying the presence of a ring signal. When no such output signal is produced, this condition denies the presence of the ring signal.

BRIEF DESCRIPTION OF THE DRAWING

The accompanying FIGURE is a circuit diagram of the invention.

DETAILED DESCRIPTION OF PREFERRED EMBODIMENT

Referring now to the FIGURE, three terminals 8, 10 and 12, identify tip, ground and ring connections respectively. Tip signals are applied between terminals 8 and 10. Ring signals are applied between terminals 12 and 10.

Terminals 8 and 12 are connected to the arms 14 and 16 of potentiometers 18 and 20 respectively. A potential of +V (typically five volts) is applied to one end of each potentiometer. The other end of each potentiometer is connected to a corresponding one of the positive input terminals 22 and 24 of a corresponding one of operational amplifiers 26 and 28. Potential +V is applied to one end of resistor 30. The other end of resistor 30 is grounded via resistor 32 and its shunting capacitor 34. The other end of resistor 30 also is connected via a corresponding one of resistors 36 and 38 to a corresponding one of terminals 22 and 24 as well as via a corresponding one of resistors 40 and 42 to a corresponding one of negative input terminals 44 and 46 of a corresponding one of operational amplifiers 26 and 28.

The output terminals 52 and 54 of each of amplifiers 26 and 28 are fed back to the corresponding negative input terminals via corresponding resistors 48 and 50. Terminal 52 is also connected to the input of operational amplifier 56 while terminal 54 is connected to the inputs of operational amplifiers 58 and 60. Potential +V is applied to the outputs of amplifiers 56 and 58 via resistor 62 and via resistor 64 to the output of amplifier 60. The outputs of amplifiers 58 and 60 are connected to the inputs of corresponding timers 66 and 68. The output of amplifier 56 is fed via operational amplifier 70 to terminal PA1. The output of timer 66 is supplied to light emitting diode (LED) 72. The output of timer 68 is fed to terminal PA2 and is also supplied to light emitting diode (LED) 74.

The circuit functions in the following manner. The ring and tip signals are alternating voltages. When a tip signal is applied between terminals 8 and 10, the output of amplifier 26 will be in excess of five volts during each positive half cycle and will be essentially at zero during negative half cycles. When the output of amplifier 22 goes positive, the output of amplifier 56 is switched from its normal positive state to essentially zero. Each time amplifier 56 is so switched, amplifier 70 is switched from its normal zero state to a positive value. As a result, the output of amplifier 22 is a pulse train of positive pulses with recurrence frequency equal to the frequency of the tip signal. The output of amplifier 56 is a like pulse train of inverted polarity and the output of amplifier 70 is a like pulse train of reinverted polarity. The pulse train appears between terminal PA1 and ground and suitable means (not part of this invention) can receive this train and measure the recurrence frequency.

When a ring signal is applied between terminals 12 and 10, amplifiers 28 and 56 function in the same manner as amplifiers 26 and 56. The outputs of amplifiers 56 and 58 are both supplied to the input of amplifier 70. Consequently, the same type pulse train is generated and supplied between terminal PA1 and ground whether the ringing signal is a tip signal or a ring signal. The first negative going pulse yielded at either one of amplifiers 56 or 58 energizes automatically reset timer 66. The output of the timer when energized is a constant positive voltage that energizes diode 72. Diode 72 then emits red light and acts as a monitor to indicate presence of a ringing signal. The timer shuts itself off after a suitable period as, for example, two hundred and fifty microseconds.

In the presence of a tip signal, the circuit is otherwise quiescent. However, when a ring signal is applied between terminals 12 and 10, the outputs of amplifiers 58 and 60 are the same. The first negative going pulse energizes automatically reset timer 68. Timer 68 then yields a constant direct voltage appearing between terminals PA2 and ground. This voltage identifies the presence of the ring signal. This voltage also energizes diode 74 which emits green light and acts as a monitor to indicate that ringing was on the ring side of the line.

What is claimed is:

1. A ringing interface card using in testing ringing signal tip and ring conductor connections of telephone cable between a telephone exchange and subscriber telephones as well as measuring the ringing signal frequencies utilized in said phones, said card comprising:
   a first set of terminals for receiving ring type and tip type ringing signals in the form of frequency variable alternating voltages which have successive half cycles with alternate positive and negative polarity and which can differ in frequency, said set including first, second and third terminals, the ring signals being applied between the first and second terminals, the tip signals being applied between the third and second terminals, said signals being supplied to said first terminal set with such timing that ring and tip signals are not present at the same time;
   first means coupled to said first and second terminals and responsive only to the presence of ring signal half cycles of positive polarity to produce a first pulse train;
   second means coupled to said third and second terminals and responsive only to the presence of tip signal half cycles of positive polarity to produce a second pulse train;
   a second set of terminals, the second set including fourth, fifth and sixth terminals, the fifth terminal being connected to said second terminal;
   third means having an input coupled to said first and second means and an output coupled to said fourth and fifth terminals, said third means responding to either one of said first and second pulse trains to supply thereto, to said fourth and fifth terminals a third pulse train which can be subsequently processed to measure its recurrence frequency which is also the ringing frequency; and
   fourth means having an input coupled to said (second) first means and an output coupled to said sixth and fifth terminals to supply to said sixth and fifth terminals a constant direct output voltage when ring signals are present.

2. The card of claim 1 wherein said third means includes an automatically reset timer which is energized for a predetermined period in response to the initial presence of either one of said first and second pulse trains and an LED connected to the output of the timer to emit light when the timer is energized.

3. The card of claim 2 wherein said fourth means includes another automatically reset timer which is energized for a predetermined period in response to the initial presence of the first pulse train, said additional timer when energized producing at its output said constant direct output voltage.

4. The card of claim 3 wherein said fourth means includes an additional LED coupled to the output of the additional timer to emit light (in the presence of said second output signal) when the additional timer is energized.

* * * * *